United States Patent
McNab

(10) Patent No.: US 11,119,057 B2
(45) Date of Patent: Sep. 14, 2021

(54) TRIP AVOIDANCE X-RAY INSPECTION

(71) Applicant: Oceaneering International, Inc., Houston, TX (US)

(72) Inventor: James Reid McNab, Aberdeenshire (GB)

(73) Assignee: Oceaneering International, Inc., Houston, TX (US)

(*) Notice: Subject to any disclaimer, the term of this patent is extended or adjusted under 35 U.S.C. 154(b) by 132 days.

(21) Appl. No.: 16/653,691

(22) Filed: Oct. 15, 2019

(65) Prior Publication Data

US 2020/0116654 A1 Apr. 16, 2020

Related U.S. Application Data

(60) Provisional application No. 62/746,460, filed on Oct. 16, 2018.

(51) Int. Cl.
  *G01N 23/12* (2018.01)
  *G01T 1/36* (2006.01)
  *G01N 23/04* (2018.01)
  *G01T 1/15* (2006.01)

(52) U.S. Cl.
  CPC ............ *G01N 23/12* (2013.01); *G01N 23/04* (2013.01); *G01T 1/36* (2013.01); *G01T 1/15* (2013.01)

(58) Field of Classification Search
  CPC .......... G01N 23/04; G01N 23/12; G01T 1/15; G01T 1/36
  See application file for complete search history.

(56) References Cited

U.S. PATENT DOCUMENTS

2015/0279489 A1* 10/2015 Milner .................. G21C 17/06
 376/245

* cited by examiner

*Primary Examiner* — David P Porta
*Assistant Examiner* — Fani Boosalis
(74) *Attorney, Agent, or Firm* — Maze IP Law, P.C.

(57) ABSTRACT

A trip avoidance X-ray inspection system, typically defining a specialized system that delivers pulsed X-rays, comprises one or more pulse X-ray cameras, each comprising a known set of effects on nucleonic instrumentation; a predetermined set of such shielded X-ray sources; a predetermined set of nucleonic instrumentation operatively in communication with one or more pulse X-ray cameras; and a digital radiography detector adapted to allow, process, or otherwise create an X-ray produced image when disposed proximate predetermined set of nucleonic instrumentation. The pulse X-ray camera is adapted to be disposed at a predetermined distance from predetermined set of shielded X-ray sources.

20 Claims, 2 Drawing Sheets

TRIP AVOIDANCE X-RAY INSPECTION

RELATION TO OTHER APPLICATIONS

This application claims priority through U.S. Provisional Application 62/746,460 filed on Oct. 16, 2018.

BACKGROUND

Nucleonic Level Control instrumentation is widely used in hydrocarbon and other industries to monitor product phase levels in pressure vessels and other equipment. Typically, this type of instrumentation has in-built radiation sources and detectors and provide vital information to optimize production while ensuring the safety of the plant operations. Typically, the radiation sources involve radiography which uses gamma radiation emitting isotopes. This upsets nucleonic level control instrumentation on pressure vessels and equipment, causing "trips" that result in costly unplanned plant shutdowns and associated process safety risks. This leads to processors needing to shut down a plant to do the radiography work, take the chance of the radiography "tripping" the plant into shutdown if they leave the nucleonics on, or turn them off and fly the plant "blind" which is dangerous since they have no indication of changes in fluid level and therefore no control over production or safe operation. A further option for an operator is to ignore all the above, not inspect due to the inconvenience involved (high risk of unplanned shutdown and the like) and run the risk of a loss of primary containment (LOPC). It can also be noted that radiography is the only volumetric inspection currently available for small bore insulated and uninsulated corroded pipework.

A large number of oil and gas pressure subsea pipework failures are caused by corrosion under insulation (CUI), which in turn can lead to a high risk of loss of pressure containment (LOPC). CUI is a severe form of localized external corrosion that occurs in carbon and low alloy steel pipe and equipment that has been insulated. This form of corrosion occurs when water is absorbed by or collected in the insulation. The equipment begins to corrode as it is exposed to water and oxygen, and temperature fluctuation, which is a common problem in the energy sector, both onshore and offshore.

Radiography is one of the most effective methods used to detect and measure CUI and other corrosion flaws, but it is often problematic to perform safety critical inspections such as corrosion detection around nucleonic level control systems using radiography because the radiation exposure can interact with nucleonic detectors causing unplanned process upsets, typically called plant and equipment "trips." Plant trips can result in an increased safety risk from interrupted process monitoring and substantial lost revenue.

For more than 25 years, there was no reliable nondestructive testing (NDT) method for detecting corrosion and CUI in the vicinity of nucleonics.

FIGURES

Various figures are included herein which illustrate aspects of embodiments of the disclosed inventions.

DESCRIPTION OF EXEMPLARY EMBODIMENTS

Figure 1:
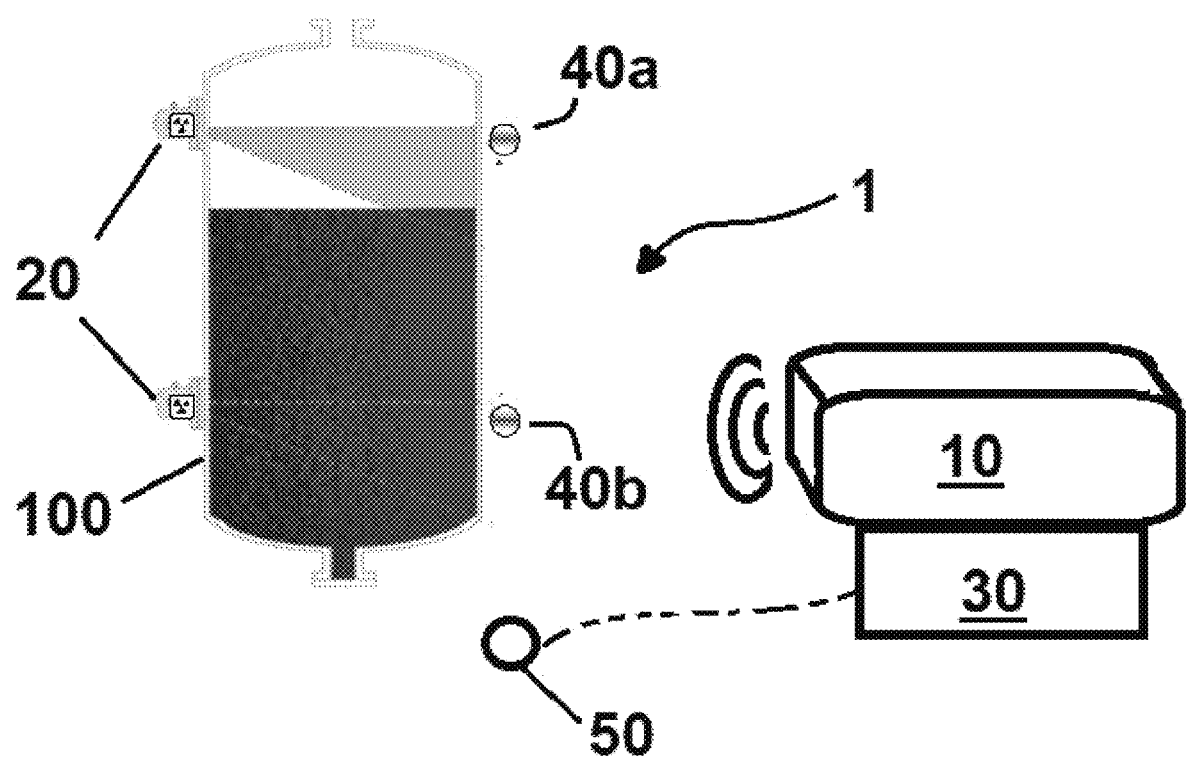
FIG. 1 is a schematic, block diagram of an illustrative system.

In a first embodiment, referring generally to FIG. 1, trip avoidance X-ray inspection system 1, which typically comprises a specialized system that delivers pulsed X-rays, comprises one or more pulse X-ray cameras 10, each comprising a known set of effects on nucleonic instrumentation; one or more shielded X-ray sources 20, defining a predetermined set of such shielded X-ray sources 20; a predetermined set of nucleonic instrumentation 30 operatively in communication with one or more pulse X-ray cameras 10; and digital radiography detector 40 adapted to allow, process, or otherwise create an X-ray produced image when disposed proximate predetermined set of nucleonic instrumentation 30. Pulse X-ray camera 10 is adapted to be disposed at a predetermined distance from predetermined set of shielded X-ray sources 20.

When installed at a processing site, e.g. a hydrocarbon processing plant, trip avoidance X-ray inspection system 1 is operative to inspect a structure such as container 100 or conduit 110 (FIG. 2) and adapted to allow or otherwise create an X-ray produced image when disposed proximate predetermined set of nucleonic instrumentation 30 without tripping digital radiography detector 40 and cause a process upset alarm at the processing site.

In typical embodiments, trip avoidance X-ray inspection system 1 further comprises one or more radiation alarms 50 operatively in communication with at least one pulse X-ray camera 10 and predetermined set of nucleonic instrumentation 30. Radiation alarm 50 is operative to detect radiation in a predetermined spectrum and trigger at a predetermined level of the detected radiation.

Figure 4:
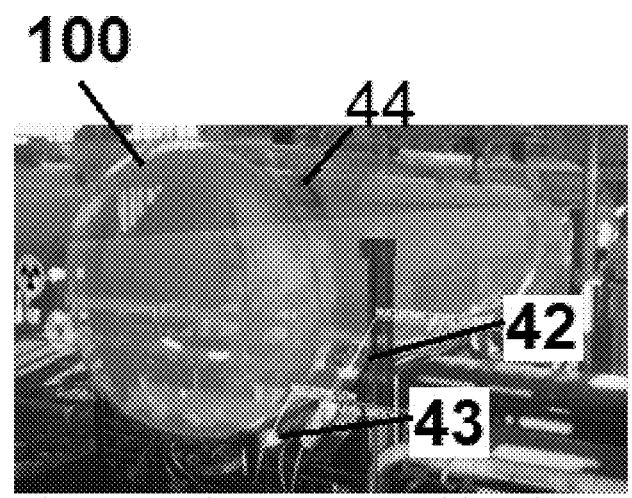
FIG. 4 is a view in partial cutaway perspective illustrating using of level switches and level detectors.

In typical embodiments, trip avoidance X-ray inspection system 1 further comprises one or more nucleonic high level detectors 40$a$ disposed proximate a structure to be inspected, e.g. container 100, and may comprise one or more high nucleonic level gauges 42 (FIG. 4). As used herein, nucleonic level gauges 42 are configured to detect high levels of radiation such as radiation emitted from shielded X-ray sources 20. Similarly, one or more low level nucleonic switches 40$b$ may be present and disposed proximate a structure to be inspected and may comprise one or more low nucleonic level switches 43 (FIG. 4). As used herein, low level switches 40$b$ are configured to detect low levels of radiation such as radiation emitted from shielded X-ray sources 20.

In the operation of exemplary methods, as an example a separator used in petroleum production is typically a large, pressurized vessel designed to separate production fluids into their main constituent components of oil, gas and water, e.g. container 100 (FIG. 1). Hydrocarbons come up from seabed through risers and are carefully monitored while being processed. In these environments, nucleonics may be used to monitor the levels of each phase, which is important because, when the vessel becomes too full or too empty, there is a risk of liquid "carry-over" into the gas system, or gas into the liquids, which can cause severe safety and production problems. Nucleonics systems work by measuring the amount of radiation that is able to travel from one side of the vessel to the other. As the fluids rise and fall, the radiation beam intensity varies when reaching the detector on the opposite side of the vessel, indicating the accurate fluid levels within the separator.

When radiography methods are deployed, nucleonic detectors can become saturated, picking up radiation nearby, and creating a "false alarm" that the fluid level has dropped significantly. When this happens, the detectors trigger an alarm which often leads to the complete shutdown of the plant or platform. This problem has made operators very wary of using radiation NDT methods offshore, with the only other alternatives either to turn off the nucleonic detectors while radiography testing takes place, leading to a "blind" situation where levels cannot be measured, or to defer the inspections until a planned shutdown or turn-around.

The claimed invention can be used to neutralize this concern by creating unique pulses of radiation which the nucleonics detectors disregard, avoiding the confusion completely, and doing it in such a way as to better meet the Ionising Radiations Regulation 2017 which are currently in place. The claimed method addresses the contentious task of managing inspection activities in the vicinity of nucleonic level control instrumentation which is typically done during shutdown periods because the equipment can affect detectors, causing false readings and alarms to trip. The claimed method and system has little effect on nucleonic detectors and helps eliminate the need for control room blind spots while also maximizing plant uptime. This enables the inspection of structures such as containers 100 or conduits 110 in close proximity to containers 100 and other equipment with nucleonic devices to be performed in a faster and more efficient way. The claimed method and system is also suitable for conducting inspections over insulation or coatings, avoiding the need to remove materials.

Referring back to FIG. 1, trip avoidance X-ray inspection system 1, as described herein, can be used to avoid an X-ray inspection trip while a processing plant is in-service. In its embodiments, the method described herein can complies with Ionising Radiation Regulations 2017 (IRR17) effective as of the date of the invention and does not require plant nucleonics isolation.

Figure 2:
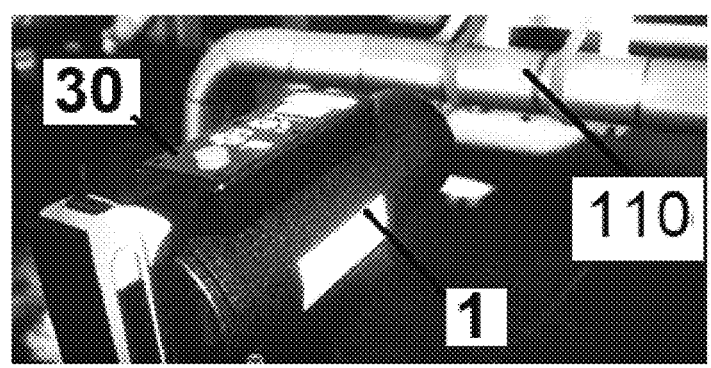
FIG. 2 is a view in partial perspective of an illustrative system disposed proximate a fluid conduit.
Figure 3:
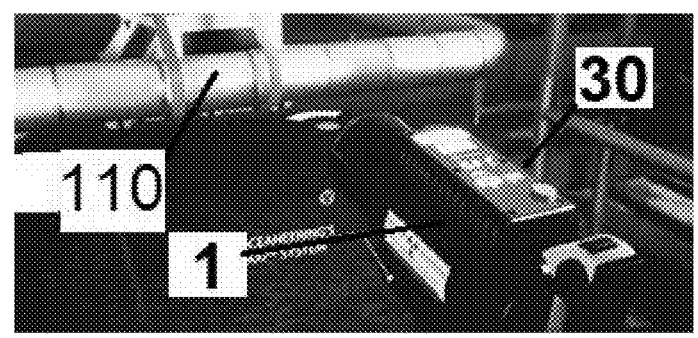
FIG. 3 is a view in partial perspective of an illustrative system disposed proximate a fluid conduit.

In a typical embodiment, referring generally to FIGS. 2-4, a predetermined set of shielded X-ray sources 20 (FIG. 1), e.g. one or more, is placed proximate a structure to be tested, e.g. containment chamber 100 (FIG. 1) or conduit 110 (FIG. 2) or the like, and at least one pulse X-ray camera 10, as described above, is positioned at a distance from the structure which is to be tested at a distance sufficient to allow pulse X-ray camera 10 to detect X-rays emitted from the predetermined set of shielded X-ray sources 20. Positioning of the predetermined set of shielded X-ray sources 20 and pulse X-ray camera 10 may occur manually, via using a tool to automate the placement and rotation of system, or the like, or a combination thereof.

Generally, once in place, shielded X-ray sources 20 emit X-rays, which can comprise pulsed X-rays, towards a predetermined area of the structure where the emitted X-rays can be detected at pulse X-ray camera 10. The predetermined area typically comprises an area proximate to nucleonic sensors or an area in and around plant equipment.

Detected X-rays may then be used when performing one or more predetermined inspection functions such as, by way of example and not limitation, non-destructive testing for corrosion, pipe thinning, or potential loss of integrity and/or in-service inspection of normally inaccessible systems, such as small-bore piping, or the like, or a combination thereof. By way of example and not limitation, the X-rays may be used produce an image on a digital radiography detector close to nucleonic instrumentation without "tripping" the plant into process upset. Nucleonic instrumentation manufacturers typically provide calibration data reviewing or otherwise reflective of individual devices which can help dictate exposure parameters to provide high quality, fast digital images with minimum impact on surrounding work requiring only small controlled areas and very short exposure duration.

If one or more radiation alarms 50 (FIG. 1) are present, radiation alarm 50 may be used to allow complying with statutory regulations, e.g. where it is mandatory to provide clear and distinct warnings of pre-exposure and during radiation exposure. Radiation alarms 50 can provide a means of complying with statutory regulations whereby it is mandatory to provide clear and distinct warnings of pre-exposure and during radiation exposure.

In certain embodiments, digitally radiograph pressure piping and infrastructure associated on, or around, equipment may be fitted with nucleonic detectors. A predetermined set of calibration data of individual devices may be reviewed prior to performing the method. Such data may be used to help dictate exposure parameters such as to provide high quality, fast digital images with minimum impact on surrounding work requiring only small controlled areas and very short exposure duration.

In certain embodiments the structure to be tested is conduit 110 (which may be a pipe) and the predetermined area of the structure to be tested comprises a high corrosion under insulation (CUI) risk area of conduit 110. In these embodiments, the predetermined inspection function typically comprises determining CUI options in an "evergreen" risk-based inspection (RBI).

In contemplated embodiments, nucleonics percentage deviations on devices, e.g. switches 42,44 (FIG. 4), which can be high level switches or low level switches or the like or a combination thereof, and/or nucleonic level gauges 42 (FIG. 4), will be known prior to commencing the work which can then allow a process central control room operator and/or a radiographer to manage the effects through close radio communication while the work takes place.

As mentioned, performing radiography operations in the vicinity of plant and equipment, which use nucleonic instrumentation, interferes and causes unplanned process upsets—this results in substantial costs from lost revenue, and increased safety risk from interrupted process monitoring and plant start-up. It can leave operators "blind" for periods of time to an increase or decrease in the fluid levels which have to be closely and constantly monitored. Radiography scopes are often cancelled or not considered even though this can be the only appropriate method to reveal and measure flaws of interest, particularly on smaller outer diameter (OD) pipes, and particularly under insulation i.e. CUI. In certain of the claimed methods, nucleonics percentage deviations on high level switches, low level switches, and nucleonic level gauges, as described above, are typically be known prior to commencing the work which allows the process Central Control Room operators and the radiographers to manage the effects through close radio communication while the work takes place.

The methods may be most effective when considered as part of a suite of Corrosion Under Insulation (CUI) options in an 'evergreen' risk-based inspection (RBI) which specifically targets high CUI risk areas of pipe work. CUI and pitting-type flaws in small diameter (<3 inch outer diameter (OD)) pipes, are challenging integrity issues and the preferred NDT method to detect and size remaining wall thickness is radiography.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A trip avoidance X-ray inspection system, comprising:
   a) a predetermined set of shielded X-ray sources adapted to be disposed proximate a structure to be inspected;
   b) a pulse X-ray camera comprising a known set of effects on nucleonic instrumentation, the pulse X-ray camera adapted to be disposed at a predetermined distance from the predetermined set of shielded X-ray sources;
   c) a predetermined set of nucleonic instrumentation operatively in communication with the pulse X-ray camera; and
   d) a digital radiography detector adapted to process an X-ray produced image when disposed proximate the nucleonic instrumentation without tripping a process upset alarm.

2. The trip avoidance X-ray inspection system of claim 1, further comprising a radiation alarm operatively in communication with the pulse X-ray camera and the predetermined set of nucleonic instrumentation, the radiation alarm operative to detect radiation in a predetermined spectrum and trigger at a predetermined level of the detected radiation.

3. The trip avoidance X-ray inspection system of claim 1, further comprising a set of nucleonic detectors disposed proximate the structure to be inspected.

4. The trip avoidance X-ray inspection system of claim 3, wherein the set of nucleonic detectors comprise a nucleonic high level detector and a nucleonic low level detector.

5. The trip avoidance X-ray inspection system of claim 3, wherein the set of nucleonic detectors comprise a nucleonic level gauge.

6. A method of avoiding an X-ray inspection trip using trip avoidance X-ray inspection system comprising a predetermined set of shielded X-ray sources adapted to be disposed proximate a structure to be inspected, a pulse X-ray camera comprising a known set of effects on nucleonic instrumentation and adapted to be disposed at a predetermined distance from the predetermined set of shielded X-ray sources, a predetermined set of nucleonic instrumentation operatively in communication with the pulse X-ray camera, and a digital radiography detector adapted to process an X-ray produced image when disposed proximate the nucleonic instrumentation without tripping a process upset alarm, the method comprising:
   a) placing the predetermined set of shielded X-ray sources proximate the structure to be tested;
   b) positioning the pulse X-ray camera at a distance from the structure to be tested sufficient to allow the pulse X-ray camera to detect X-rays emitted from the shielded X-ray sources;
   c) causing the shielded X-ray sources to emit pulsed X-rays towards a predetermined area of the structure to be tested;
   d) detecting the emitted pulse X-rays at the pulse X-ray camera; and
   e) using the detected X-rays to perform a predetermined inspection function.

7. The method of claim 6, wherein the predetermined area comprises an area of nucleonic sensors.

8. The method of claim 6, wherein the predetermined area comprises an area in and around plant equipment.

9. The method of claim 6 wherein the method is performed while the structure to be tested is part of a plant that is in-service.

10. The method of claim 6, wherein:
    a) the structure to be tested comprises a pipe;
    b) the predetermined area of the structure to be tested comprises a high corrosion under insulation (CUI) risk area of the pipe; and
    c) the predetermined inspection function comprises determining CUI options in an "evergreen" risk-based inspection (RBI).

11. The method of claim 6, further comprising using the pulse X-ray camera to produce an image without tripping a process upset.

12. The method of claim 6, further comprising using a predetermined set of calibration data review of individual devices prior to performing the method to help dictate exposure parameters to provide high quality, fast digital images with minimum impact on surrounding work requiring only small Controlled Areas and very short exposure duration.

13. The method of claim 6, wherein the positioning of the predetermined set of shielded X-ray sources and pulse X-ray camera occurs manually.

14. The method of claim 6, wherein the positioning of the predetermined set of shielded X-ray sources and pulse X-ray camera comprises using a tool to automate the placement and rotation of system.

15. The method of claim 6, wherein using a known set of nucleonics percentage deviations on level switches and nucleonic level gauges prior to commencing the method to allow a process Central Control Room operator and a radiographer to manage the effects through close radio communication while the work takes place.

16. The method of claim 15, wherein the level switches comprise nucleonic high level switches or nucleonic low level switches.

17. The method of claim 6, wherein the trip avoidance X-ray inspection system further comprises a radiation alarm, the method further comprising using the radiation alarm to aid in complying with a statutory regulation.

18. The method of claim 6, wherein the predetermined inspection function comprises non-destructive testing for corrosion, pipe thinning, or potential loss of integrity.

19. The method of claim 6, wherein the predetermined inspection function comprises in-service inspection of a normally inaccessible system.

20. The method of claim 6, wherein the method complies with Ionising Radiation Regulations 2017 (IRR17) and does not require plant nucleonics isolation.

* * * * *